Sept. 14, 1965  E. A. VON SEGGERN ETAL  3,205,879
DUAL FUEL SUPPLY MEANS FOR EXCESS AIR CYCLE ENGINE
Filed May 24, 1963  2 Sheets-Sheet 1
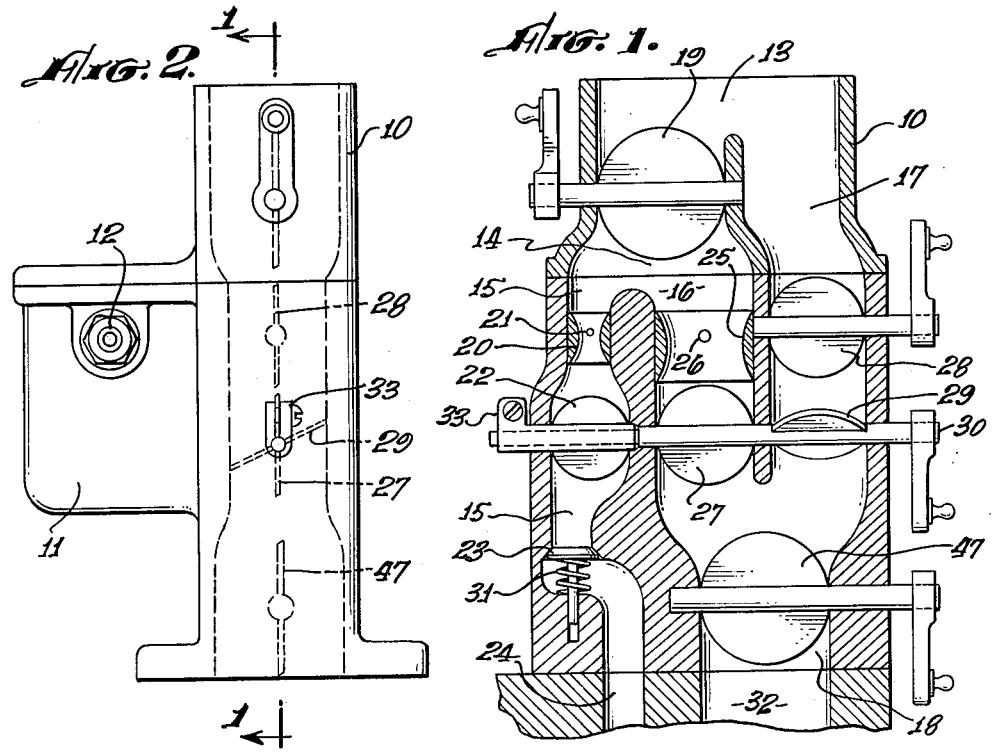
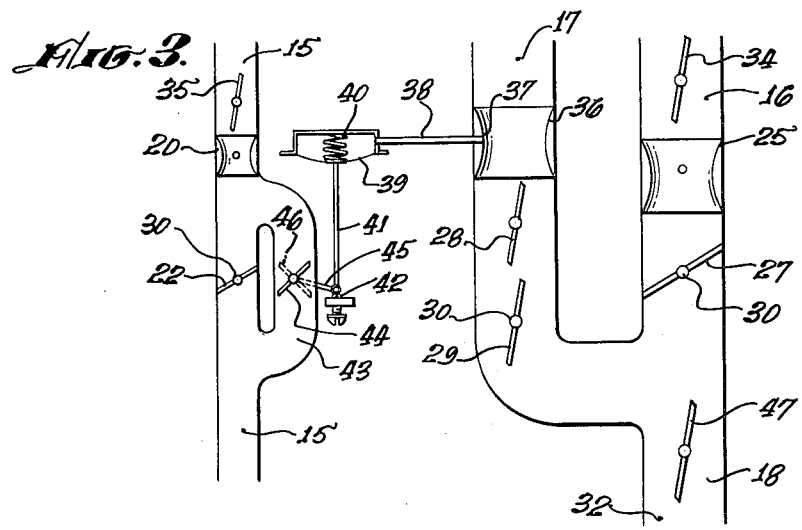
INVENTORS.
ERNEST A. VON SEGGERN,
HENRY E. VON SEGGERN,
BY
ATTORNEY.

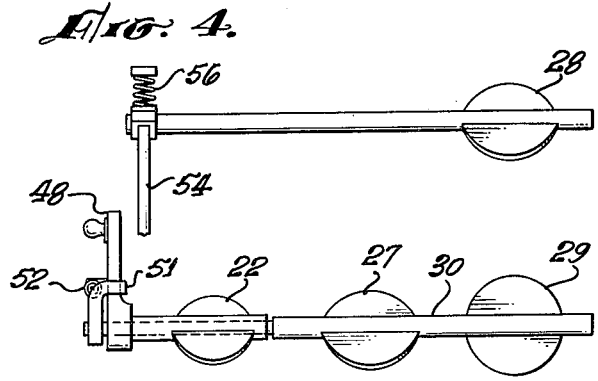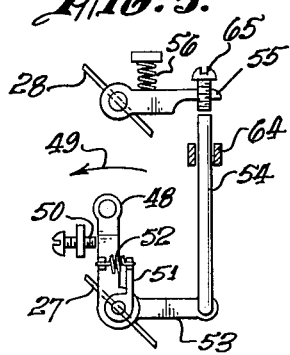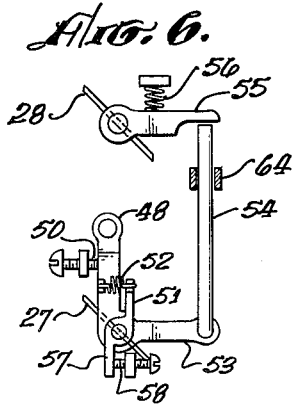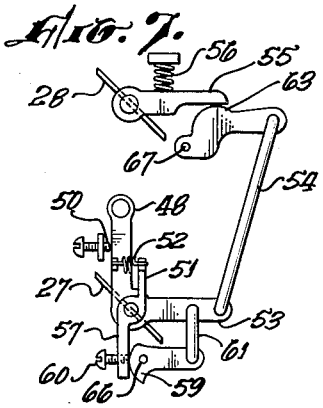

United States Patent Office 3,205,879
Patented Sept. 14, 1965

3,205,879
DUAL FUEL SUPPLY MEANS FOR EXCESS AIR CYCLE ENGINE
Ernest A. von Seggern, 1051 E. Angeleno, Burbank, Calif., and Henry E. von Seggern, Rte. 2, Box 1910, Escondido, Calif.
Filed May 24, 1963, Ser. No. 283,089
17 Claims. (Cl. 123—127)

This invention relates to fuel supply means for excess air cycle engines of the type which have a combustion chamber and an ignition chamber or other means for localizing an ignition charge. In particular it relates to fuel supply means for engines of this class illustrated by the preferred form (FIGS. 5 and 6) of excess air cycle engine disclosed in our copending application Serial No. 278,383, filed May 6, 1963, and entitled Excess Air Cycle Engine. The subject matter of this application is incorporated herein by this reference. Engines of this class have dual intake manifolds and fuel is supplied to the engine through these manifolds. The invention is, however, not limited to this type of fuel delivery system, but includes also those systems which employ direct combustion chamber injection and may operate with only single air intake means.

It is a general object of the invention to provide a fuel supply means which is suitable for light fuels such as gasoline, and which is capable of being operated in two distinct manners; i.e., as a fuel supply means for an excess air cycle engine, and, by a very simple transformation, as a fuel supply means for the same engine operating as a throttled air engine in standard Otto cycle engine practice.

Other more specific objects include the provision of a fuel supply means which is designed to function as a standard carburetor when the engine is being started from cold, using the standard choke means and using throttled air to produce a vacuum in the intake manifold to enhance vaporization of the fuel as well as to control the power output of said engine; also, the provision of control means which instantly convert the operation from a throttled air cycle to an excess air cycle; and, also, control means for making the engine idle steadily when operating on excess air.

Other general objects and features of the invention as well as special objects and features will be described in the specification in conjunction with the description of the specific forms shown herein.

The fuel supply means which attains the aforesaid objects consists essentially of a pair of standard carburetors, of which one has no throttle, except for the idle control, and operates at all times under a "full load" condition. This supplies a fuel-air mixture to the ignition chamber of the engine. The other carburetor has a standard throttle, but is provided with an air bypass, so that this carburetor does not restrict air flow to the cylinder when its throttle is closed. Its function is to control fuel flow, but not air flow. When the bypass is closed, the carburetor functions in its normal manner and delivers the usual balanced fuel-air mixture to the cylinder.

Additional features of the invention will be described in conjunction with a description of the fuel supply means and its mode of operation. In the accompanying drawings showing a typical illustrative embodiment of the broad invention:

FIG. 1 is a vertical section of the fuel supply means taken along the broken line 1—1 of FIG. 2;

FIG. 2 is a side view of the means shown in FIG. 1;

FIG. 3 is a diagrammatic sketch of auxiliary fuel cut-off means;

FIG. 4 is a front view of the control valves as shown in FIG. 1 with modified control levers (housing structure of FIG. 1 omitted for simplicity);

FIG. 5 is a side view of the modified control levers shown in FIG. 4;

FIG. 6 is a side view of the control levers of FIG. 5 with additional controls; and FIG. 7 is a side view of the control levers of FIG. 6 with further modified controls.

The fuel supply means will be described as it would appear in a typical down draft carburetor form, but it is evident that horizontal or vertical draft forms could be employed, or that several units could be combined in a group if desired. In FIGS. 1 and 2 a housing 10 includes a float chamber 11, and a fuel supply fitting and line 12. The float chamber contains the usual float and needle valve assembly (not shown) for maintaining fuel at a suitable level in said chamber. Passing through said housing is an air passage which consists of an inlet port 13, a plenum chamber 14, a first branch passage 15, a second branch passage 16, a third branch passage 17, and a common outlet port 18 for branch passages 16 and 17. A choke 19 of any conventional type is provided in inlet port 13. The first branch passage 15 includes a venturi 20, through which a fuel jet 21 of conventional design extends. A throttle valve 22 is placed below said venturi, and below said throttle valve is placed a spring-loaded poppet valve 23. The passage extends below said valve and connects to the auxiliary intake manifold 24.

The second passage 16 includes a venturi 25 through which a fuel jet 26 of conventional design extends and a throttle valve 27 which is placed below said venturi. The third passage 17 includes a first throttle valve 28 and a second throttle valve 29 below valve 28. Valves 29, 27 and 22 are all mounted on a common control rod 30.

In normal operation on excess air an engine of the type described takes in a fixed proportion of the total displacement of the engine through the auxiliary manifold 24. This fills the ignition chamber of the engine and is always constant. There is no variable restriction in passage 15, and the air flow therethrough is proportional only to engine speed. Accordingly, the fuel flow control through jet 21 is equivalent to a standard carburetor operating at full load, and responsive only to engine speed. The valve 22 when open offers no flow resistance. Valve 23, being spring loaded by spring 31, introduces a fixed resistance to flow, independent of flow rate, and does not affect the functioning of the jet 21 and venturi 20. The function of the valve 23 is to maintain a fixed partial vacuum in the auxiliary manifold 24 at all times, and thereby assist in vaporizing fuel passing to the engine.

Under full load operation, air valves 27 and 22 are full open, aand valve 29 is closed. Air flows in parallel through passages 15 and 16, and jets 21 and 26 deliver fuel as in a pair of standard carburetors at full load. The jets are compensated to deliver a balanced fuel-air ratio at all engine speeds in the usual manner. The fuel-air mixture produced in venturi 25 passes out through passage 18 and into the main intake manifold 32 which delivers it to the engine cylinders, while the mixture formed in venturi 20 passes out through passage 15 and into the auxiliary intake manifold 24 to the engine ignition chambers.

At part load operation the fuel and air flow through manifold 24 remains constant, the same as at full load, but the fuel flow from jet 26 is reduced by partially closing valve 27. This restricts the air flow through venturi 25. Simultaneously, the air valve 29 opens, and allows air to bypass the venturi 25, so that the total air flow through passage 18 and manifold 32 is not reduced. The fuel-air mixture produced in venturi 25 mixes with the air passing through valve 29, and a "lean" fuel-air mixture is produced in manifold 32. Valves 27 and 29 are placed on control rod 30, so that when one is closed, the other is full open, and vice versa. Hence, at full load, valve 27 is open, valve 29 is closed, and a balanced fuel-air ratio mixture is supplied to the engine cylinders. At no load, valve 27 is closed and valve 29 is open, and air only is supplied to the cylinders. At intermediate positions both valves are partially open and the fuel mixture supplied to the engine goes from a stoichiometric mixture at full load, progressively leaner and leaner until it becomes only pure air at no load. Under these conditions, engines of this class are designed to idle on the fuel supplied to the ignition chambers alone.

The valve 28, which is placed in passage 17 above valve 29, is designed to be held in either a fully opened position for normal operation, as just described, or in a fully closed position. When fully closed, the air bypas no longer functions, and then valve 27 functions as the "throttle" in a standard carburetor. The manifold 32 receives a balanced fuel-air mixture at all openings of valve 27, and at correspondingly reduced pressure. The engine then operates as a standard gasoline engine, both ignition chamber and cylinder being supplied with near stoichiometric fuel-air mixtures at variable pressure. This is desirable for starting the engine, especially when cold, and standard choke means 19 may be employed in the conventional manner as well as standard idling jets (not shown). A cold engine may be started and warmed up when operating as an ordinary gasoline engine much more satisfactorily than when operating on the excess air cycle, because with excess air there is no vacuum to assist vaporization and the internal cooling obtained by the passage through the engine of large volumes of cold air, plus the inherent reduction of heat rejection due to the greater thermal efficiency of the cycle, makes the excess air cycle engine very slow to warm up. For cold weather operation, it is necessary to employ every known means to conserve heat, such as heating the intake air by exhaust heat, putting shutters over the radiator, and using cooling fans with clutches.

Valve 28 also serves as a safety valve since all excess air cycle engines, including diesels, are subject to "run away" if fuel is accidentally introduced into the air stream going through the engine. By closing valve 28, the engine is instantly converted to a standard gasoline engine and it cannot overspeed.

It is evident that when valve 28 is opened, the effectiveness of choke 19 is immediately removed, hence, if valve 28 is opened before the engine has warmed sufficiently to operate without a choke, misfiring may result. To avoid this, the choke may be separated into two separate valves, one 34 for the passage 16 and one 35 for the small passage 15. This arrangement is shown diagrammatically in FIG. 3. These two chokes may be completely independent or be mounted on a common rod, and be either automatically or manually operated as desired. As shown, the mixture supplied to the auxiliary intake manifold may be enriched at will independently of the position of control valve 28.

In order to obtain a stable, self-governed idle, equivalent to that normally obtained with carburetors, it is desirable to introduce a fixed flow restriction in passage 15 when the engine idles, so that if the engine tends to speed up, the quantity of mixture delivered per cycle is reduced, and conversely, if the engine slows down, the quantity of fuel delivered per cycle is increased. The valve 22 is clamped to rod 30 by the usual clamp means 33 and is adjusted so that when rod 30 is turned to fully close valve 27, valve 22 is just nearly closed, and restricts the air flow through manifold 24 in sufficient quantity to reduce the engine idle speed to the desired value. The engine speed range controlled by this valve is normally from what is considered a "fast idle," typically 500 to 800 r.p.m. in an automotive type engine, to about 300 to 350 r.p.m. which is a normal rate, but serves to maintain the speed at a constant value, like a mechanical governor. Valve 22 is large and quick opening, so that as soon as rod 30 is turned to open valve 27 to increase the power output of the engine, the fixed flow resistance in passage 15 is completely removed.

There are several ways in which the functions of valves 22, 27 and 28 in the basic fuel supply means shown in FIG. 1 may be coordinated. As already described, valve 22 is an idle speed control, valve 27 is the main mixture control, and valve 28 is the control for changing operation from that of an ordinary throttled gasoline engine to that of an excess air cycle engine.

The basic standard mode of operation of excess air cycle engines of the class under consideration is that in which a fixed size ignition charge fires a variable fuel-air ratio mixture which is the power charge. The variations in modes of operation to be considered are as follows:

Variation No. 1 already described is to close valve 28 and operate over the entire speed range and load as a standard gasoline engine.

Variation No. 2, also described above, is to partially throttle the ignition chamber charge under no load conditions to obtain a stable idling speed.

Variation No. 3 is to substantially vary the power output of the ignition chamber by means of the throttle valve 22 as well as to obtain stable idling. The volume of the ignition chamber of the engine is made larger than in the basic engine design relative to the volume of the main combustion chamber in order to utilize this control. It is designed to produce up to about one-quarter of the total power of the engine and from idle speed up to this maximum load, control is by throttle 22. Beyond this point, valve 27 begins to open and the large flame from the combustion in the large ignition chamber is more effective in igniting the lean fuel-air mixtures introduced into the main combustion chamber than in the basic design.

A diagrammatic illustration of the valve control for this mode of operation appears in FIGS. 4 and 5. Valve 22, instead of being clamped to rod 30, is rotatably mounted thereon, and has a control lever 48 attached to it. Valve 22, as well as valve 27, is closed by a counterclockwise movement as indicated by arrow 49 in FIG. 5. The amount of movement of valve 22 is controlled by adjustable stop 50 and adjusts the idle speed of the engine. Shaft 30 extends through lever 48 and has a lug 51 fastened thereto which is engaged by lever 48 when it is moved clockwise. The lug and lever are normally held in contact by spring 52, and both valve 27 and 22 are opened by clockwise movement of lever 48. When moved to a closing position, valve 27 closes first and cuts off all fuel to the main combustion chamber. Valve 22 does not yet restrict mixture flow to the ignition chamber of the engine. Further movement of lever 48 in the direction of arrow 49 stretches spring 52 and closes valve 22, restricting the mixture flow until stop 50 is engaged, at which time the idling position is reached.

Variation No. 4 is similar to No. 3, but in addition air valve 28 is partially closed, to throttle the main air entering the cylinder. This may be about the same amount as the throttling of the charge going to the ignition chamber, or more, to suit conditions. Power is still developed only by combustion in the ignition chamber, but the amount of excess air is reduced and consequently the internal temperatures are higher. This is desirable in particular for cold operation, in which an excess of cold air makes it difficult to achieve complete combustion in the engine.

The mechanism for achieving this mode of operation is also shown in FIG. 5. Lever 48 has an extension arm 53, which, by a connecting rod 54, moves lever 55. Rod 54 is supported by a guide 64, and engages an adjustment screw 65 in lever 55. Lever 55 operates valve 28, and valves 22 and 28 are arranged to open and close together. Both valves are large compared to the flow they control and are quick acting near the shut-off position.

Only near the idling position does valve 28 restrict the air flow to the main combustion chamber of the engine. Rod 54 can push lever 55 up against spring 56, but for Variation No. 1 when valve 28 is closed continuously for standard gasoline operation, it is seen that valve 28 may be held closed without interfering with the operation of lever 48. Adjustment screw 65 regulates the relative closing position of valves 22 and 28. It also may be unscrewed to the point where rod 54 no longer engages it. Then the mechanism operates as described in Variation No. 3.

Variation No. 5 is similar to No. 4, but instead of merely throttling the air stream to some extent, this air is entirely cut off at idle conditions and the engine idles like a standard gasoline engine. It is most important, in achieving a clean, odorless combustion, particularly under cold operating conditions, to have the combustion flame spread throughout the entire combustion space without being quenched before its completion. This is most readily done with a stoichiometric fuel-air mixture throughout the entire combustion chamber. Now as the power output of the engine is increased, it is possible to begin to introduce excess air into the main combustion chamber, but never in such quantity that the spread of flame (and temperature) through this chamber is impaired. As the size of the charge in the ignition chamber increases (with increased output of the engine) the ability of the ignition charge to fire the charge in the main combustion chamber increases, and excess air may be gradually introduced. If the quantity of fuel delivered to the main combustion chamber is held substantially uniform, while the size of the ignition chamber charge increases to its maximum, the flame is able to spread completely through the combustion chamber even though the fuel-air ratio steadily diminishes. From this point on, the fuel-air ratio increases until at full load it is stoichiometric again. With this method of operation the fuel-air ratio in the ignition chamber is always stoichiometric, but the charge density goes from a minimum (standard gasoline engine idling practice) to a maximum (unthrottled) density as the engine goes from no load to approximately one-quarter load (this terminal point may be varied quite widely to suit specific operating conditions). From this point to full load it remains constant as in the basic design. The fuel-air ratio of the fuel-air mixture in the main combustion chamber varies widely. It begins at no load as a throttled low density stoichiometric charge, then by the addition of excess air, it reaches a point of maximum density and maximum leanness concurrently with the establishment of the ignition charge at its maximum size. During this critical transition period, the mixture ratio, size of flame, charge density, internal temperature and flame spread are balanced such that at no point does the combustion fail to complete, and correspondingly, at no point are incomplete products of combustion released to the atmosphere. From this point on to full load, there is no problem, as the addition of more fuel to the main combustion chamber supply increases the fuel-air ratio and combustion approaches stoichiometric conditions throughout. The exact proportions of fuel and air added to the main combustion chamber during the initial transition period are subject to adjustment to suit individual engines and specific operating conditions, but some control of this type is desirable for obtaining the cleanest, most odor-free combustion in combination with the maximum thermal efficiency. The size of the ignition chamber relative to that of the main combustion chamber influences the adjustments, and with a strong ignition flame the engine may idle on a somewhat lean mixture in the main combustion chamber instead of with a stoichiometric mixture.

A diagrammatic illustration of control means for this type of operation is shown in FIGS. 6 and 7. In FIG. 6 a second lug 57 is added to lug 51 on rod 30. An adjustable stop screw 58 limits the motion of lug 57, and is adjusted to keep valve 27 from closing completely. At no load, idle operation, the adjustments are set so that valve 28 is closed completely, valve 27 is open slightly, and valve 22 is open slightly. With this setting the engine idles like a standard gasoline engine with a low density, stoichiometric fuel-air mixture uniformly distributed throughout the ignition chamber and main combustion chamber. As lever 48 is moved clockwise, valve 22 opens and valve 28 opens, but valve 27 remains in its slightly open position. This movement increases the size and density of the stoichiometric fuel-air mixture supplied to the ignition chamber, and the density of the charge delivered to the main combustion chamber is adjusted to closely parallel that admitted to the ignition chamber, but its fuel-air ratio becomes progressively leaner. When lever 48 touches lug 51, normal density has been reached in the ignition chamber and main combustion chamber and then the fuel valve 27 begins to open and more fuel is supplied to the main combustion chamber.

A similar arrangement is shown in FIG. 7 except that the stop 58 is replaced by a cam 59. Lever 57 has an adjustable screw 60 resting on the cam, and the cam pivoted at point 66 is connected by a rod 61 to lever 53 which is part of the main control lever 48. The contour of cam 59 can be varied to produce any desirable variation of opening of valve 27 relative to valves 22 and 28. A cam 63 pivoted at point 67 may also be provided, operated by rod 54, that controls the opening of air valve 28 in any desirable relation to valve 27. These two cams enable any desirable relationship of the main charge density and mixture ratio relative to that of the ignition chamber charge to be obtained.

Depending upon operating conditions, a compromise has to be made between maximum efficiency at idling and part load, and combustion odor. Maximum efficiency is naturally obtained when the engine idles or runs with unthrottled air and maximum charge density. The exhaust, while clear, is nevertheless not odorless, because of flame quenching. Mixing the excess air with the flaming gases lowers the flame temperature, and also the temperature drop, due to expansion during the power stroke, is a maximum with full charge density. Both together act to quench the flame. When the flame is cooled below incandescent temperature before burning is completed, products of partial combustion are formed, and these are always obnoxious to varying degree. By reducing charge density, and thereby also thermal efficiency, more fuel is burned per cycle, in less air, so that temperatures are higher for a given load condition. These higher temperatures prevent quenching of the flame and the odor disappears. A completely stratified charge at low density, or a stratified pair of charges of different fuel-air ratios (stoichiometric and lean) will both give an odorless combustion, but the latter will do so at lower engine operating temperatures.

There is one mode of operation to which automotive engines are subjected, which ordinary industrial engines do not encounter. This is overspeeding of the engine caused by the vehicle coasting down hills at a rate faster than the engine would ordinarily drive it under its own power. Under these conditions, if the flow of air and fuel through manifold 24 is restricted by valve 22 set at its normal idle position, as in the arrangement of FIG. 1, the fuel mixture admitted per cycle to the ignition chamber becomes so small misfiring may occur. It is desirable to provide means which will either keep the size of charge constant at all times except slow idle, or cut off all fuel entirely, and then turn it on again when the engine reaches idle speed, or the engine is required to develop power.

FIG. 3 shows, diagrammatically, an arrangement of the basic design of FIG. 1 whereby the engine operates with a fixed quantity of mixture per cycle at all speeds, coasting or not. A venturi 36 is provided in passage 17 which has a hole 37 at the low pressure point in the venturi throat, and a tube 38 connects the hole to a diaphragm unit 39. A spring 40 biases the diaphragm down, as shown, and pushes a connecting rod 41 against an adjustable stop 42. The auxiliary passage 15 contains the valve 22 as also shown in FIG. 1, but there is now provided a bypass passage 43 around valve 22, and a valve 44 is provided therein. Valve 44 has an arm 45 which is connected to rod 41. As shown, valve 22 is now closed, and valve 44 is adjusted by screw 42 to a partially open position which restricts air flow through passage 43 sufficiently to idle the engine at no load operation. Valve 22 and 29 are adjusted to open and close alternately with their common rod 30; i.e., valve 22 and valve 27 open and close together as in FIG. 1. When the engine idles normally, air velocity through venturi 36 is low and spring 40 holds rod 41 against stop 42 and valve 44 controls the idle speed. As soon as power is required valve 22 opens with valve 27 and the bypass valve 44 loses control. But if valve 22 is closed while the engine is running at a high speed, the air flow through venturi 36 is fast, there is a pressure drop at hole 37, diaphragm 39 is pulled up against spring 40 and valve 44 is opened. There is no restriction in bypass passage 43 and the normal size charge flows to the ignition chambers. When the engine speed drops to a fast idle the spring pushes the rod down and closes valve 44 to the slow idle position.

In the alternate mode of operation, the position of valve 44 is changed to that shown by dotted lines 46. This represents a slow idle position also as adjusted by screw 42. The engine idles, as before with valve 22 closed. At high engine speeds, the air velocity through venturi 36 causes diaphragm 39 to pull up against spring 40 and close valve 46 completely. Hence, if power is cut off and valve 22 closes, all fuel and air flow through manifold 24 is cut off. This keeps fuel completely out of the engine cylinder, and it is filled by air through the main manifold 32. As engine speed approaches a slow idle, the spring 40 opens valve 46 to the slow idle position and the engine again receives fuel and idles on its own power. These functions have been described as applied to the basic arrangement of FIG. 1, but it is evident that they could also be applied to the several variations described earlier.

Unthrottled excess air cycle engines do not provide an automatic braking drag when coasting like ordinary throttled gasoline engines, and while the absence of drag reduces fuel consumption on level road operation, it may be desirable to introduce this drag when needed. Accordingly, a valve 47 may be provided in passage 18 which is connected to the vehicle foot brake or similar means, and is adapted to be closed to a point where maximum drag is obtained preferably before the regular service brake is applied. If combined with the auxiliary fuel cut-off device described above so no power is being developed while the engine is coasting and this restrictive valve is in operation, more drag will be obtained than is customary in ordinary gasoline engines. There is also no hydrocarbon emission or incomplete combustion because of the complete cut-off of fuel while coasting, or braking with vacuum assistance.

The fuel supply means described herein has been designed in particular for the preferred form of engine already referred to, but it is also adaptable to those standard forms of dual intake manifold and dual combustion chamber engines in which the dual intake valves open concurrently, or at least with considerable overlap. The preferred form of engine referred to has its dual valves open and close in sequence so that when the engine is operated in its basic form with full unthrottled air at all times, the charging of the ignition chamber is accomplished with precision and definition. This method of operation is preferred for maximum thermal efficiency at part load, but as pointed out, this does not give the cleanest, odor-free and smog-free combustion. To obtain that, the methods of operation which include throttling of the air and fuel supply are necessary, and when this is done, it is possible to draw air or fuel and air through either or both manifolds in any desirable proportion in accordance with the opening and closing of throttle valves in the respective intake manifolds. Only a little throttling is necessary to control the flow, and this may take place up to nearly full load without noticeably impairing the efficiency. At full load a stoichiometric mixture is supplied to each manifold and it makes no difference how the two chambers are filled since they are all alike at full load.

As an example of operation of the fuel supply means on a standard dual intake valve engine, considered operation according to the method described in Variation No. 4 above. Under idle, no load operation air flow to the main intake manifold 32 is completely or almost completely cut off, so that the cylinder is completely charged with the stoichiometric fuel-air mixture taken in through manifold 24. Since engines of this class always have a connecting passage between the ignition chamber and the main combustion chamber, the piston simply draws the fuel charge into the cylinder through the ignition chamber, and then compresses it back in again, in part, during the compression stroke. At the end of the compression stroke, both chambers are uniformly charged with a stoichiometric charge at low density (since for no load operation valve 22 is also nearly closed). In effect, the engine runs entirely with fuel supplied through the small auxiliary intake manifold and the engine operates as a standard gasoline engine with throttled charges. If, however, valve 28 is opened slightly at no load, as contemplated in the method of operation No. 4, some air will enter the cylinder through manifold 32 directly into the main combustion chamber, and consequently the fuel charge in the cylinder and main combustion chamber will be leaner than that in the ignition chamber. This is the same condition as was obtained in the preferred form of engine. In this mode of operation the fuel for the ignition chamber, as well as some fuel for the main combustion chamber can be supplied through the auxiliary manifold 24 above, and then the originally stoichiometric fuel-air mixture is diluted with air in the combustion chamber itself. By taking more fuel-air mixture in through the ignition chamber than is to be retained therein, the ignition chamber is well purged of residual exhaust gases, and an excellent combustion is obtained therein. When the throttle valve 22 is full open, and all the fuel mixture possible is being taken through the auxiliary manifold (which is usually small compared to the main intake manifold) and the portion of this mixture that remains in the main combustion chamber has been diluted with air in the desired amount, then the main mixture valve 27 begins to open and additional fuel reaches the main combustion chamber. The control of charge density and mixture ratio is easily adjusted by the controls shown in FIGS. 6 and 7, if the simple control of FIG. 5 is not sufficient. As pointed out in connection with operation in the method of Variation No. 5, these controls can provide any desired variation in charge density and fuel-air ratio desired, and operation with an engine with valves which open concurrently is in essence entirely parallel to that with valves that open in sequence, provided one operates in the partially throttled modes.

It will be evident that the fuel supply means described is not limited to the standard carburetor float bowl and fuel jet type of fuel metering system but that other known methods, such as the air valve and metering pin system may be used. Also the diaphragm operated metering pin system actuated by air pressure variation through a venturi like the diaphragm 39 and venturi 36 may be used interchangeably, either in like pairs or with other supply means to supply fuel to the two manifolds. Fuel injection pumps and injectors, atomizing or non-atomizing, either alone or in combination with any of the above

We claim:

1. In fuel supply means for an internal combustion engine of the class having dual intake manifolds which supply fuel and air mixtures independently to an ignition chamber and a main combustion chamber of said engine, the combination of: a fuel supply means which delivers a fuel-air mixture of substantially stoichiometric proportions to said ignition chamber intake manifold, a fuel supply means which delivers a fuel-air mixture of substantially stoichiometric proportions to said main combustion chamber intake manifold, an air passage in communication with said main combustion chamber intake manifold at a point between said fuel supply means and said main combustion chamber, an air flow control valve in said air passage, a fuel-air mixture flow control valve, and means to coordinate the air flow control valve and said fuel-air mixture flow control valve.

2. In fuel supply means for an internal combustion engine of the class having dual intake manifolds which supply fuel and air mixtures independently to an ignition chamber and a main combustion chamber of said engine, the combination of: a first fuel supply means which delivers a fuel-air mixture of substantially stoichiometric proportions to said ignition chamber intake manifold, a second fuel supply means which delivers a fuel-air mixture of substantially stoichiometric proportions to said main combustion chamber intake manifold, a valve in combination with said second fuel supply means which controls the quantity of fuel and air mixture delivered to said main combustion chamber intake manifold, an air passage in communication with said main combustion chamber intake manifold at a point between said second fuel supply means and said main combustion chamber, an air flow control valve in said air passage, and means to coordinate said mixture control valve and said air control valve such that when one is open the other is closed, and vice versa.

3. In fuel supply means for an internal combustion engine of the class having dual intake manifolds which supply fuel and air mixtures independently to an ignition chamber and a main combustion chamber of said engine, the combination of: a first fuel supply means which delivers a fuel-air mixture of substantially stoichiometric proportions to said ignition chamber intake manifold, a second fuel supply means which delivers a fuel-air mixture of substantially stoichiometric proportions to said main combustion chamber intake manifold, a first valve in combination with said second fuel supply means which controls the quantity of fuel and air mixture delivered to said main intake manifold, an air passage in communication with said main combustion chamber intake manifold at a point between said second fuel supply means and said main combustion chamber, a second valve in said air passage, and common shaft means to which said first and said second valves are fastened such that when one is open the other is closed, and vice versa.

4. In fuel supply means for an internal combustion engine of the class having dual intake manifolds which supply fuel and air mixtures independently to an ignition chamber and a main combustion chamber of said engine, the combination of: a first fuel supply means which delivers a fuel-air mixture of substantially stoichiometric proportions to said ignition chamber intake manifold, a second fuel supply means which delivers a fuel-air mixture of substantially stoichiometric proportions to said main combustion chamber intake manifold, a valve in combination with said second fuel supply means which controls the quantity of fuel and air mixture delivered to said main combustion chamber intake manifold, an air passage in communication with said main combustion chamber intake manifold at a point between said second fuel supply means and said main combustion chamber, a first air flow control valve in said air passage, means to coordinate said mixture control valve and said first air flow control valve, and a second air flow control valve in said air passage independent of said mixture control valve and said first air flow control valve.

5. In fuel supply means for an internal combustion engine of the class having dual intake manifolds which supply fuel and air mixtures independently to an ignition chamber and a main combustion chamber of said engine, the combination of: a first fuel supply means which delivers a fuel-air mixture of substantially stoichiometric proportions to said ignition chamber intake manifold, substantially constant pressure valve means in said intake manifold to produce a substantially fixed pressure drop in gases passing through said manifold, a second fuel supply means which delivers a fuel-air mixture of substantially stoichiometric proportions to said main combustion chamber intake manifold, an air passage in communication with said main combustion chamber intake manifold at a point between said second fuel supply means and said main combustion chamber, and an air flow control valve in said air passage.

6. In fuel supply means for internal combustion engine of the class having dual intake manifolds which supply fuel and air mixtures independently to an ignition chamber and a main combustion chamber of said engine, the combination of: a first fuel supply means which delivers a fuel-air mixture of substantially stoichiometric proportions to said ignition chamber intake manifold, a second fuel supply means which delivers a fuel-air mixture of substantially stoichiometric proportions to said main combustion chamber intake manifold, a first valve in combination with said second fuel supply means which controls the quantity of fuel and air mixture delivered to said main intake manifold, an air passage in communication with said main combustion chamber intake manifold at a point between said second fuel supply means and said main combustion chamber, a second valve in said air passage to control the flow of air into said main intake manifold, means to coordinate said first and said second valves so that when one is open the other is closed, and vice versa, and a third valve in said ignition chamber intake manifold to partially restrict the flow of fuel-air mixture to said ignition chamber when said first valve is closed.

7. In fuel supply means for an internal combustion engine of the class having dual intake manifolds which supply fuel and air mixtures independently to an ignition chamber and a main combustion chamber of said engine, the combination of: a first fuel supply means which delivers a fuel-air mixture to said ignition chamber intake manifold, a second fuel supply means which delivers a fuel-air mixture to said main combustion chamber intake manifold, an air passage in communication with said main combustion chamber intake manifold at a point between said second fuel supply means and said main combustion chamber, an air flow control valve in said air passage, and an air flow control valve in said main combustion chamber intake manifold at a point between said point of entry of said air passage into said manifold and said combustion chamber.

8. In fuel supply means for an internal combustion engine of the class having dual intake manifolds which supply fuel and air mixtures independently to an ignition chamber and a main combustion chamber of said engine, the combination of: a first fuel supply means which delivers a fuel-air mixture to said ignition chamber intake manifold, a second fuel supply means which delivers a fuel-air mixture to said main combustion chamber intake manifold, a first valve in combination with said second fuel supply means which controls the quantity of fuel delivered to said main chamber intake manifold, an air passage in communication with said main combustion chamber intake manifold at a point between said second fuel supply means and said main combustion chamber, a second valve in said air passage to control the flow of air into said main chamber intake manifold, means to coordinate said first and said second valves so that when one is open the other is closed, and vice versa, a third valve in said ignition chamber intake manifold in coordination wth said first valve such that both valves are closed together, a bypass passage around said third valve, a fourth valve in said bypass passage, and air flow responsive means in said air passage connected to said fourth valve in said bypass passage which open said valve from a partially closed position to an open position when air flow through said air passage is high and partially close it when air flow is low.

9. In fuel supply means for an internal combustion engine of the class having dual intake manifolds which supply fuel and air mixtures independently to an ignition chamber and a main combustion chamber of said enginer, the combination of: a first fuel supply means which delivers a fuel-air mixture to said ignition chamber intake manifold, a second fuel supply means which delivers a fuel-air mixture to said main combustion chamber intake manifold, a first valve in combination with said second fuel supply means which controls the quantity of fuel delivered to said main chamber intake manifold, an air passage in communication with said main combustion chamber intake manifold at a point between said second fuel supply means and said main combustion chamber, a second valve in said air passage to control the flow of air into said main chamber intake manifold, means to coordinate said first and said second valves so that when one is open the other is closed, and vice versa, a third valve in said ignition chamber intake manifold in coordination with said first valve such that both valves are closed together, a bypass passage around said third valve, a fourth valve in said bypass passage, and air flow responsive means in said air passage connected to said fourth valve in said bypass passage which moves said valve from a partially closed position to a fully closed position when air flow through said air passage is high and partially close it again when air flow is low.

10. In fuel supply means of the type which prepare substantially stoichiometric fuel-air charges for an engine of the type having a main combustion chamber and a separate ignition chamber and individual fuel charge admission means to each chamber, the method of controlling the power output of said engine, which includes as steps: supplying separate substantially stoichiometric fuel-air charges from said fuel supply means to said individual fuel charge admission means in variable quantity to control the power of said engine, and independently supplying a variable quantity of air to said main combustion chamber fuel charge admission means in coordination with said fuel-air charge, whereby said combustion chamber receives a fuel-air charge whose fuel-air ratio varies as a function of the power output of said engine.

11. In dual fuel supply means of the type which prepare fuel-air charges for an engine of the type having a main combustion chamber and a separate ignition chamber and individual fuel charge admission means, the method of operating said engine in either of two cycles and controlling the power, which includes as steps: supplying substantially stoichiometric fuel-air charges individually to said fuel admission means at variable density for operation on one cycle, then supplying a substantially stoichiometric charge to said ignition chamber fuel admission means at constant density, and supplying fuel and air at constant density in variable quantity to said main combustion chamber fuel admission means to vary the fuel-air ratio of the fuel-air charge supplied to said main combustion chamber, for operation on the other cycle.

12. In dual fuel supply means of the type which prepare fuel-air charges for an engine of the type having a main combustion chamber and a separate ignition chamber and individual fuel charge admission means, the method of controlling the power of said engine, which includes as steps: supplying a substantially stoichiometric fuel-air charge at all times to said ignition chamber fuel charge admission means, varying the density of said charge only from no load to part load operation while supplying said main combustion chamber fuel admission means with air only, then supplying fuel and air, in variable quantity, at constant density to said main combustion chamber fuel admission means, to vary the fuel-air ratio of the charge supplied to said main combustion chamber and thereby vary the power from part load to full load.

13. In dual fuel supply means of the type which prepare fuel-air charges for an engine of the type having a main combustion chamber and a separate ignition chamber and individual fuel charge admission means, the method of controlling the power of said engine, which includes as steps: supplying a substantially stoichiometric fuel-air charge to said ignition chamber fuel charge admission means at all times, supplying fuel and air in varying proportions to said main combustion chamber fuel admission means, controlling power output initially from no load to part load by varying the charge density, then supplying fuel and air in variable quantity to said main combustion chamber fuel admission means at constant density, to vary the fuel-air ratio of the charge supplied to said main chamber, and thereby varying the power from part load to full load.

14. In dual fuel supply means of the type which prepare fuel-air charges for an engine of the type having a main combustion chamber and a separate ignition chamber and individual fuel charge admission means, the method of controlling the power of said engine, which includes the steps: supplying a substantially stoichiometric fuel-air charge to said ignition chamber fuel charge admission means and air to said main chamber admission means at variable density from no load to part load, then supplying a substantially stoichiometric fuel-air charge of constant density to said ignition chamber fuel admission means at constant density and supplying fuel and air in variable quantity at constant density to said main chamber fuel admission means, to vary the fuel-air ratio of the fuel-air charge supplied to said main combustion chamber, and thereby varying the power from part load to full load.

15. In dual fuel supply means of the type which prepare fuel-air charges for an engine of the type having a main combustion chamber and a separate ignition chamber and individual fuel charge admission means, the method of controlling the power of said engine, which includes as steps: supplying a substantially stoichiometric fuel-air charge to said ignition chamber charge admission means at all times, varying the charge density from no load to part load and operating at constant density from part load to full load, supplying fuel and air in varying proportion to said main chamber charge admission means at low density at no load, adding air in excess to said fuel and air to increase the charge density and reduce the fuel-air ratio up to constant density at part load, and reducing the quantity of air relative to fuel added at constant density to increase the fuel-air ratio to stoichiometric proportions at full load.

16. In dual fuel supply means of the type which prepare fuel-air charges for an engine of the type having a main combustion chamber and a separate ignition chamber and individual fuel charge admission means, the method of controlling the power of said engine, which includes as steps: supplying a substantially stoichiometric fuel-air charge to said ignition chamber charge admission means at all times, supplying fuel and air to said main chamber fuel charge admission means in varying proportion at variable density from no load to part load, then supplying fuel and air in variable quantity at constant density to said main chamber fuel charge admission means to vary the power from part load to full load.

17. In fuel supply means for an engine of the type having a main combustion chamber and an ignition chamber, the method of controlling the power output of said engine, which includes the steps: providing a substantially stoichiometric fuel-air charge in said ignition chamber at all times, varying the charge density from no load to part load and operating at constant density from part load to full load, providing a nearly stoichiometric fuel-air charge, but with some excess air at no load at low density in said main combustion chamber, increasing the density to part load while increasing the excess of air to reduce the fuel-air ratio, operating from part load to full load at constant density with decreasing excess air until substantially stoichiometric fuel-air proportions are reached at full load.

References Cited by the Examiner

UNITED STATES PATENTS

| | | | |
|---|---|---|---|
| 2,011,992 | 8/35 | Aseltine | 123—75 |
| 2,121,920 | 6/38 | Mallory | 123—75 |
| 2,244,214 | 6/41 | Rescara | 123—75 |
| 2,317,625 | 4/43 | Mallory | 123—127 |
| 2,460,046 | 1/49 | Vincent | 123—127 |
| 2,652,039 | 9/53 | Weslake | 123—75 |

KARL J. ALBRECHT, *Primary Examiner.*